US009807431B2

(12) United States Patent
Hannuksela et al.

(10) Patent No.: US 9,807,431 B2
(45) Date of Patent: Oct. 31, 2017

(54) GENERIC INDICATION OF ADAPTATION PATHS FOR SCALABLE MULTIMEDIA

(75) Inventors: Miska Hannuksela, Ruutana (FI); Ye-Kui Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1653 days.

(21) Appl. No.: 11/874,138

(22) Filed: Oct. 17, 2007

(65) Prior Publication Data
US 2008/0095230 A1   Apr. 24, 2008

Related U.S. Application Data

(60) Provisional application No. 60/853,232, filed on Oct. 20, 2006.

(51) Int. Cl.
*H04N 21/236* (2011.01)
*H04N 21/414* (2011.01)
*H04N 21/434* (2011.01)
*H04N 21/6377* (2011.01)
*H04N 21/6437* (2011.01)
*H04N 21/647* (2011.01)
*H04N 21/658* (2011.01)
*H04N 21/81* (2011.01)

(52) U.S. Cl.
CPC . *H04N 21/23614* (2013.01); *H04N 21/41407* (2013.01); *H04N 21/4348* (2013.01); *H04N 21/6377* (2013.01); *H04N 21/6437* (2013.01); *H04N 21/64792* (2013.01); *H04N 21/658* (2013.01); *H04N 21/8106* (2013.01)

(58) Field of Classification Search
None
See application file for complete search history.

(56) References Cited

U.S. PATENT DOCUMENTS

| 5,640,543 | A | 6/1997 | Farrell et al. |
| 8,743,950 | B2 * | 6/2014 | Amonou ......... H04N 21/64792 348/663 |
| 2005/0254575 | A1 * | 11/2005 | Hannuksela ......... H04N 19/70 375/240.1 |
| 2006/0013313 | A1 | 1/2006 | Han et al. |

(Continued)

FOREIGN PATENT DOCUMENTS

| EP | 0 665 693 A2 | 8/1995 |
| EP | 1 542 476 A2 | 6/2005 |

(Continued)

OTHER PUBLICATIONS

Frojdh, P., et al. "Study on t 4496-t 2:2005/PDAM2 ALCIFLUTE server file formaL" Oct. 13, 2006.*

(Continued)

*Primary Examiner* — Christopher Crutchfield
*Assistant Examiner* — Thinh Tran
(74) *Attorney, Agent, or Firm* — Alston & Bird LLP

(57) ABSTRACT

A file format structure for use with scalable video coding systems and methods, where a rate share operation box indicates which adaptation operation points for coded media are available in a file. The rate share operation box can include a characterization of the adaptation result for each adaptation operation point. In addition, the rate share operation box can include an identifier that indicates which algorithm was used in generating each adaptation operation point.

10 Claims, 5 Drawing Sheets

(56) References Cited

U.S. PATENT DOCUMENTS

| | | | |
|---|---|---|---|
| 2008/0052306 A1* | 2/2008 | Wang | H04N 7/52 |
| 2009/0185619 A1* | 7/2009 | Taleb | H04N 21/2335 |
| | | | 375/240.02 |

FOREIGN PATENT DOCUMENTS

| | | | |
|---|---|---|---|
| EP | 1 679 903 A2 | | 7/2006 |
| EP | 1691553 | | 8/2006 |
| WO | WO2006/108917 | * | 10/2006 |
| WO | WO-2006/108917 | | 10/2006 |
| WO | WO 2006/108917 | | 10/2006 |
| WO | WO 2007/078227 | | 7/2007 |

OTHER PUBLICATIONS

Supplementary European Search Report for European Application No. 07 82 6777 dated Oct. 1, 2009.
Rathgen, T., et al. "Use Cases and Evaluation Criteria for the SVC file format," Joint Video Team (JVT) of ISO/IEC MPEG & ITU-T VCEG (ISO/IEC JTC1/SC29/WG11 and ITU-T SG16 Q6), No. M12924, Jan. 11, 2006, Bangkok, Thailand, pp. 1-6.
Karczewicz and Kurceren, The SP- and SI-Frames design for H.264/AVC. IEEE Transactions on Circuits for Video Technology, 13(7): 637-644, 2003.
International Search Report for PCT Application No. PCT/IB2007/054232.
English translation of Office action corresponding Korean Application No. 2009-7010260 dated Aug. 19, 2010.
English translation of Office action in corresponding Chinese Application No. 200780047577.6 dated Aug. 23, 2010.
Frojdh, P., et al. "Study on 14496-12:2005/PDAM2 ALC/Flute server tile, format." Oct. 13, 2006.
Office Action for European Patent Application No. 07826777.0, dated Sep. 29, 2011.
Final Rejection from Korean Intellectual Property Office for Korean Application No. 10-2009-7010260, dated Jun. 23, 2011.
English translation of Final Rejection from Korean Intellectual Property Office for Korean Application No. 10-2009-7010260, dated Jun. 23, 2011.
Office Action for Mexican Patent Application No. MX/a/2009/004121, dated Jun. 29, 2011.
English translation of Office Action for Mexican Patent Application No. MX/a/2009/004121, dated Jun. 29, 2011.
Office Action for Chinese Patent Application No. 200780047577.6, dated Jul. 6, 2011.
English translation of Office Action for Chinese Patent Application No. 200780047577.6, dated Jul. 6, 2011.
Office Action from Vietnamese Application No. 1-2009-00995, dated Apr. 12, 2012.
Office Action from Canadian Application No. 2,666,622, dated Mar. 1, 2012.
Office Action from Chinese Application No. 200780047577.6, dated Mar. 31, 2012.
Office Action for European Application No. 07 826 777.0 dated Dec. 22, 2010.
Written Opinion/Search Report for Singapore Application No. 200902626-1 dated Oct. 22, 2010.
Vietnamese Office Action for Application No. 1-2009-00995, dated Oct. 31, 2013.
Summons to Attend Oral Proceedings Pursuant to Rule 115(1) EPC from European Patent Application No. 07826777.0 dated Mar. 13, 2013.
Office Action from Vietnamese Patent Application No. 1-2009-00995 dated Jun. 27, 2014.
Written Opinion from International Application No. PCT/IB2007/054232 dated Jan. 31, 2008.
International Preliminary Report on Patentability from International Application No. PCT/IB2007/054232 dated Apr. 22, 2009.
First Examination Report for Indian Application No. 2621/DELNP/2009 dated Jun. 29, 2015.
Office Action for Vietnamese Application No. 1-2009-00995 dated Dec. 31, 2014.
Office Action from Mexican Application No. MX/a/2009/004121, dated Oct. 16, 2012.
Office Action from Mexican Application No. MX/a/2009/004121, dated Feb. 1, 2012.

* cited by examiner

GENERIC INDICATION OF ADAPTATION PATHS FOR SCALABLE MULTIMEDIA

FIELD OF THE INVENTION

The present invention generally relates to the field of scalable video coding. More particularly, the present invention relates to generically indicating adaptation paths for scalable multimedia.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Multimedia applications include local playback, streaming or on-demand, conversational and broadcast/multicast services. Technologies involved in multimedia applications include, for example, media coding, storage and transmission. Media types include speech, audio, image, video, graphics and time text. Different standards have been specified for different technologies.

There are a number of video coding standards including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 or ISO/IEC MPEG-4 AVC. H.264/AVC is the work output of a Joint Video Team (JVT) of ITU-T Video Coding Experts Group (VCEG) and ISO/IEC MPEG. There are also proprietary solutions for video coding (e.g. VC-1, also known as SMPTE standard 421M, based on Microsoft's Windows Media Video version 9), as well as national standardization initiatives, for example AVS codec by Audio and Video Coding Standard Workgroup in China. Some of these standards already specify a scalable extension, e.g. MPEG-2 visual and MPEG-4 visual. For H.264/AVC, the scalable video coding extension SVC, sometimes also referred to as SVC standard, is currently under development.

The latest draft of the SVC is described in JVT-T201, "Joint Draft 7 of SVC Amendment," 20th JVT Meeting, Klagenfurt, Austria, July 2006, available from http://ftp3.itu.ch/av-arch/jvt-site/2006_07_Klagenfurt/JVT-T201.zip.

SVC can provide scalable video bitstreams. A portion of a scalable video bitstream can be extracted and decoded with a degraded playback visual quality. A scalable video bitstream contains a non-scalable base layer and one or more enhancement layers. An enhancement layer may enhance the temporal resolution (i.e. the frame rate), the spatial resolution, or simply the quality of the video content represented by the lower layer or part thereof. In some cases, data of an enhancement layer can be truncated after a certain location, even at arbitrary positions, and each truncation position can include some additional data representing increasingly enhanced visual quality. Such scalability is referred to as fine-grained (granularity) scalability (FGS). In contrast to FGS, the scalability provided by a quality enhancement layer that does not provide fined-grained scalability is referred as coarse-grained scalability (CGS). Base layers can be designed to be FGS scalable as well.

The mechanism for providing temporal scalability in the latest SVC specification is referred to as the "hierarchical B pictures" coding structure. This feature is fully supported by Advanced Video Coding (AVC), and the signaling portion can be performed by using sub-sequence-related supplemental enhancement information (SEI) messages.

The mechanism for providing temporal scalability in the latest SVC specification is referred to as the "hierarchical B pictures" coding structure. This feature is fully supported by AVC, and the signaling portion can be performed by using sub-sequence-related supplemental enhancement information (SEI) messages.

For mechanisms to provide spatial and CGS scalabilities, a conventional layered coding technique similar to that used in earlier standards is used with some new inter-layer prediction methods. Data that could be inter-layer predicted includes intra texture, motion and residual data. Single-loop decoding is enabled by a constrained intra texture prediction mode, whereby the inter-layer intra texture prediction can be applied to macroblocks (MBs) for which the corresponding block of the base layer is located inside intra MBs. At the same time, those intra MBs in the base layer use constrained intra prediction. In single-loop decoding, the decoder needs to perform motion compensation and full picture reconstruction only for the scalable layer desired for playback (called the desired layer). For this reason, the decoding complexity is greatly reduced. All of the layers other than the desired layer do not need to be fully decoded because all or part of the data of the MBs not used for inter-layer prediction (be it inter-layer intra texture prediction, inter-layer motion prediction or inter-layer residual prediction) are not needed for reconstruction of the desired layer.

The spatial scalability has been generalized to enable the base layer to be a cropped and zoomed version of the enhancement layer. The quantization and entropy coding modules were adjusted to provide FGS capability. The coding mode is referred to as progressive refinement, wherein successive refinements of the transform coefficients are encoded by repeatedly decreasing the quantization step size and ap plying a "cyclical" entropy coding akin to sub-bitplane coding.

The scalable layer structure in the current draft SVC standard is characterized by three variables, referred to as temporal_level, dependency_id and quality_level, that are signaled in the bit stream or can be derived according to the specification. temporal_level is used to indicate the temporal layer hierarchy or frame rate. A layer comprising pictures of a smaller temporal_level value has a smaller frame rate than a layer comprising pictures of a larger temporal_level. dependency_id is used to indicate the inter-layer coding dependency hierarchy. At any temporal location, a picture of a smaller dependency_id value may be used for inter-layer prediction for coding of a picture with a larger dependency_id value. quality_level is used to indicate FGS layer hierarchy. At any temporal location and with identical dependency_id value, an FGS picture with quality_level value equal to QL uses the FGS picture or base quality picture (i.e., the non-FGS picture when QL−1=0) with quality_level value equal to QL−1 for inter-layer prediction.

In single-loop decoding of scalable video including at least two CGS or spatial scalable layers, only a portion of a coded picture in a lower layer is used for prediction of the corresponding coded picture in a higher layer (i.e. for inter-layer prediction). Therefore, if a sender knows the scalable layer desired for playback in the receivers, the bitrate used for transmission could be reduced by omitting those portions that are not used for inter-layer prediction and not in any of the scalable layers desired for playback. It should be noted that, in the case of a multicast or broadcast, where different clients may desire different layers for playback, these layers are called desired layers.

The bitstream format of SVC includes signaling of simple_priority_id in each network abstraction layer (NAL) unit header of SVC. This enables signaling of one adaptation path for the SVC bitstream. In addition, the adaptation of SVC bitstreams can be done along dependency_id, quality_level, and temporal_level or any combination of these and simple_priority_id. However, simple_priority_id is capable of representing only one partition of SVC bitstreams to adaptation paths. Other adaptation partitions, based upon different optimization criteria, could be equally well-computed, but no means to associate these adaptation partitions to the SVC bitstream exist.

The file format is an important element in the chain of multimedia content production, manipulation, transmission and consumption. There is a difference between the coding format and the file format. The coding format relates to the action of a specific coding algorithm that codes the content information into a bitstream. The file format refers to organizing the generated bitstream in such a way that it can be accessed for local decoding and playback, transferred as a file, or streamed, all utilizing a variety of storage and transport architectures. Further, the file format can facilitate the interchange and editing of the media. For example, many streaming applications require a pre-encoded bitstream on a server to be accompanied by metadata (stored in "hint-tracks") that assists the server to stream the media to a client. Examples of hint-track metadata include timing information, indication of synchronization points, and packetization hints. This information is used to reduce the operational load of the server and to maximize the end-user experience.

Available media file format standards include the ISO base media file format (ISO/IEC 14496-12), MPEG-4 file format (ISO/IEC 14496-14), AVC file format (ISO/IEC 14496-15) and 3GPP file format (3GPP TS 26.244). There is also a project in MPEG for development of the SVC file format, which will become an amendment to AVC file format. The MPEG-4, AVC, 3GPP, and SVC file formats are all derivatives of the ISO base media file format, i.e. they share the same basic syntax structure. Consequently, they are largely compatible with each other.

ISO base media file format is an object-oriented file format, where the data is encapsulated into structures called 'boxes'. In all derivative file formats of the ISO base media file format, the media data is stored in a media data box MDAT and the meta data is stored in a movie box MOOV. The media data comprises the actual media samples. It may comprise for example interleaved, time-ordered video and audio frames. Each media has its own metadata box TRAK in the MOOV box that describes the media content properties. Additional boxes in the MOOV box may comprise information about file properties, file content, etc.

The SVC file format is becoming an extension to the AVC file format. The SVC file format handles the storage, extraction and scalability provisioning of the scalable video stream efficiently. The size of a file containing a scalable bit stream should be as small as possible, while still allowing for lightweight extraction of NAL units belonging to different layers. This requires avoiding redundant storage of multiple representations of the media data and an efficient representation of metadata. There are two primary mechanisms utilized to organize an SVC file. First, a grouping concept, i.e., the sample group structure in the ISO base media file format, can be used to indicate the relation of pictures and scalable layers. Second, several tracks referencing subsets of the bitstream can be defined, each corresponding to a particular combination of scalability layers that form a playback point.

FIG. 1 depicts how the SVC media data is stored in a file. Each access unit comprises one sample. A number of samples form a chunk. Practical content normally comprises many chunks. File readers typically read and process one chunk at a time. If the layering structure desired for playback does not require all of the access units (for temporal scalability) and/or all of the pictures in each required access unit (for other types of scalability), then the unwanted access units and/or pictures can be discarded. It is most efficient to perform a discarding operation at the picture level. However, because each sample comprises one access unit, a sample-level grouping is not optimal. On the other hand, if each picture were defined as one sample, then the definition of each sample being the media data corresponding to a certain presentation time in the ISO base media file format would be broken.

In the latest draft SVC file format, the word 'tier' is used to describe a layer. Each NAL unit is associated with a group ID, and a number of group ID values are mapped to a tier, identified by a tier ID. This way, given a tier ID, the associated NAL units can be found. The scalability information, including bitrate, spatial resolution, frame rate, and so on, of each tier is signalled in the data structure ScalableTierEntry( ).

Timed metadata tracks, introduced in Amendment 1 of ISO base media file format, contain samples that describe associated media or hint tracks. Different sample formats for the timed metadata track can be specified, and the format used in the timed metadata track can be identified from the reference to a particular sample entry syntax, identified by a four-character code. The samples of the timed metadata track are associated with timestamps and are therefore associated to samples of the corresponding timestamp in the referred track.

Draft Amendment 2 of the ISO base media file format contains three main features to extend the ISO base media file format. First, it specifies structures that help in delivering files stored in the meta box of a ISO base media file over file delivery protocols such as ALC and FLUTE. In particular, the amendment provides functionality to store pre-computed FEC encodings of files and to define hint tracks with server instructions facilitating encapsulation of files into ALC/FLUTE packets. Second, Amendment 2 specifies a method to provide time-dependent information on target ratios between scalable or alternative streams that are supposed to share a common bandwidth resource. This information is referred to as the combined rate scaling information. Third, the amendment also specifies how to include additional meta boxes that carry alternative and/or complementary information to a meta box in a file.

The combined rate scaling information in draft ISO base media file format Amendment 2 is based on two fundamental assumptions:

1. It is assumed that the total bitrate of a channel through which combined media (e.g., audio and video) should be conveyed is limited to a certain constant, or is a piece-wise constant function of time. However, rather than indicating an optimal audio-video bitrate share for a certain total bitrate, certain applications would benefit from an indication of an adaptation path resulting in stable audio-visual quality or experience. For example, if statistical multiplexing is used in broadcast applications, then the bitrate of an individual audiovisual service is allowed to vary in order to maintain a stable quality. At the same time, the total bitrate across all audiovisual services for a multiplex should remain unchanged. Traditionally, rate share information to maintain a stable quality cannot be indicated.

2. Only the target bitrate share between tracks is given. However, no hints or "cookbook" instructions as to how to obtain the indicated target bitrate share by adaptation are given. Consequently, since there are many possibilities for adapting scalable media, e.g., frame rate scaling or quality scaling, the result of the adaptation process in different implementations can greatly differ. Therefore, the value of the combined rate scaling information of the draft ISO base media file format Amendment 2 is diminished.

As described above, SVC utilizes single-loop decoding, i.e. reference pictures are decoded only for the highest decoded layer. Consequently, switching between layers at arbitrary locations is not possible, as the reference pictures of the layer to be switched have not been decoded. The presence of a layer switching point can be concluded from SVC NAL unit headers, but no mechanism exists in conventional systems to indicate switching points in the SVC file format structures. Furthermore, a coded video sequence remains valid if SVC NAL units above a certain threshold simple_priority_id are removed. However, no guarantee as to stream validity is given if the simple_priority_id threshold is changed in the middle of a coded video sequence (i.e. between IDR access units).

SUMMARY OF THE INVENTION

The present invention provides a file format structure for use with scalable media coding systems and methods, where a rate share operation box indicates which adaptation operation points for coded media are available in a file. The rate share operation box can include a characterization of the adaptation result for each adaptation operation point. In addition, the rate share operation box can include an identifier that indicates which algorithm was used in generating each adaptation operation point.

Therefore, any unit processing a file with a rate share operation box can choose a desired adaptation operation point based upon how the constraints and capabilities of the unit match up with the characteristics of the adaptation operation point or the desired algorithm with which the adaptation operation point was calculated. Rate share information can be provided so that it can be utilized to maintain stable audio-visual quality in a media stream. In addition, resulting media from the adaptation of scalable media in terms of, for example, frame rate scaling and quality scaling, is more consistent.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE VARIOUS EMBODIMENTS

The present invention provides a file format structure, referred to herein as a "rate share operation box," for indicating which adaptation operation points for coded media are available in a file.

Figure 1:
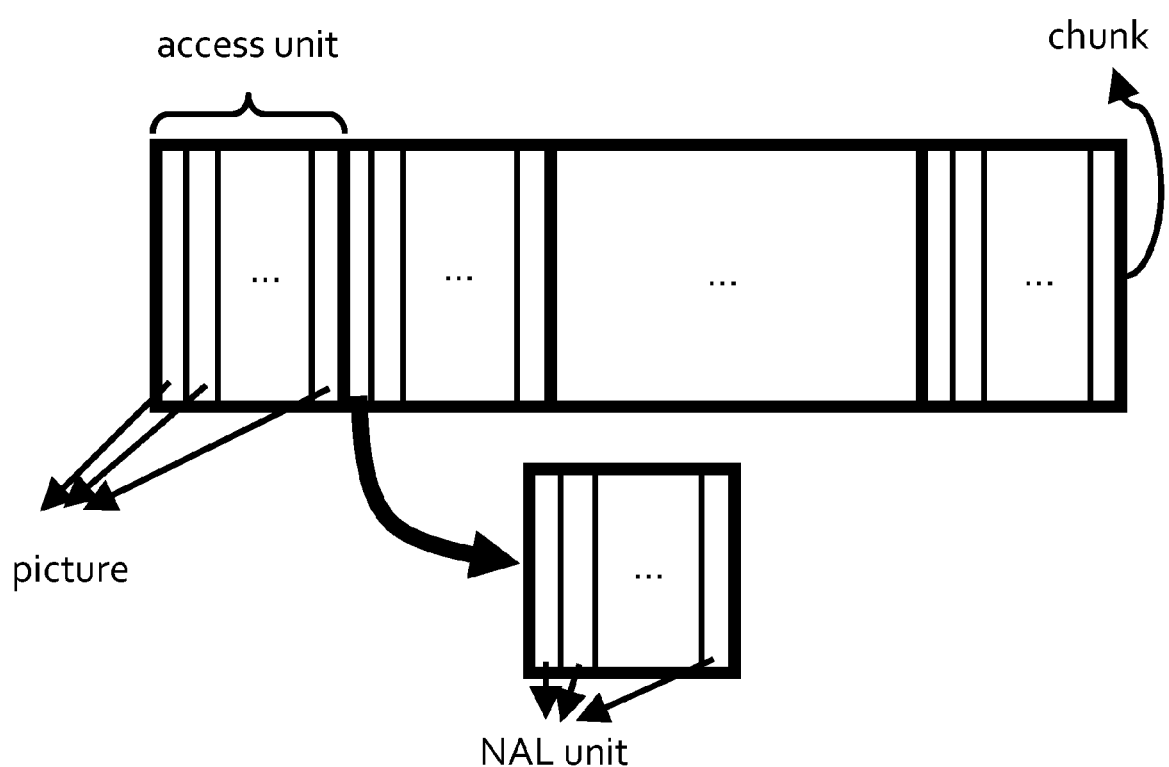
FIG. 1 is a representation showing how SVC media data is stored in a file.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to a sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and the sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. Finally, a renderer 170 may reproduce the uncompressed media streams with a loudspeaker or a display, for example. The receiver 150, the decoder 160, and the renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
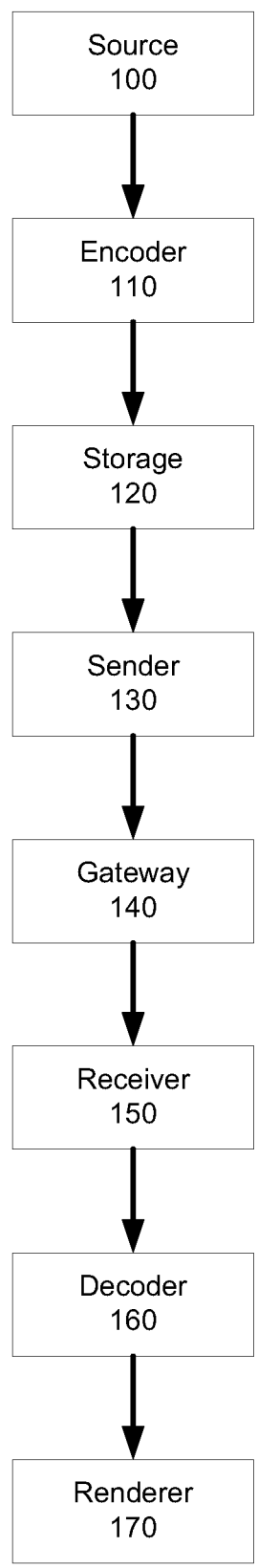
FIG. 2 shows a generic multimedia communications system for use with the present invention.
Figure 3:
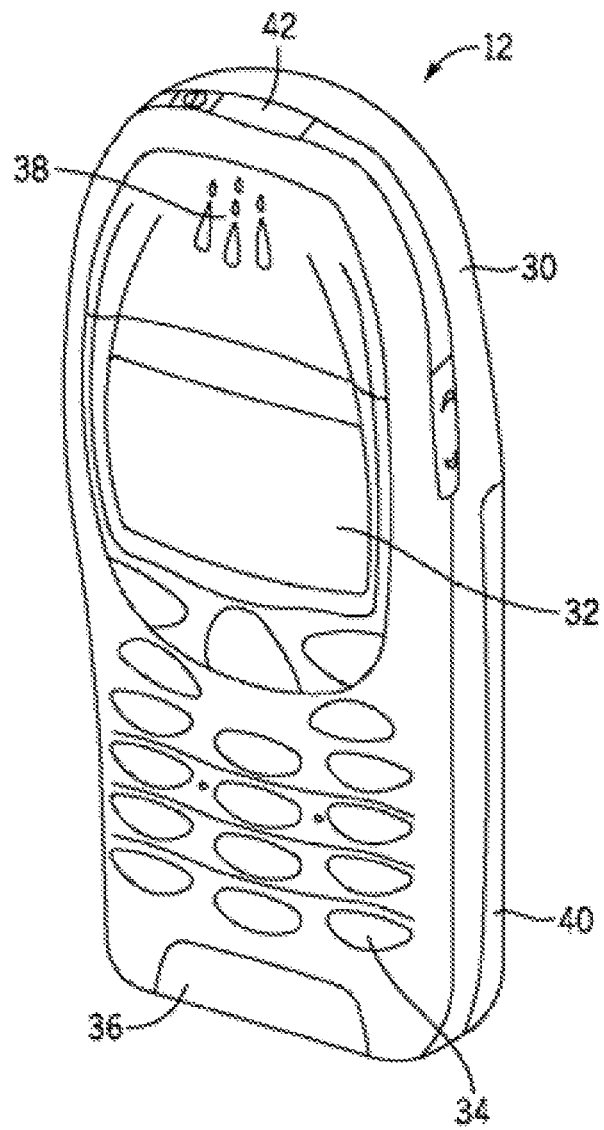
FIG. 3 is a perspective view of a mobile telephone that can be used in the implementation of the present invention.

FIGS. 2 and 3 show one representative mobile telephone 12 within which the present invention may be implemented. It should be understood, however, that the present invention is not intended to be limited to one particular type of mobile telephone 12 or other electronic device. Some or all of the features depicted in FIGS. 2 and 3 could be incorporated into any or all of the devices represented in FIG. 1.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

When combinations of scalable media streams are delivered over a channel with a constrained bandwidth, it is necessary to provide provisions for indicating how to dynamically perform extraction of data portions from all of the media that is jointly delivered. Therefore, a file containing one or more scalable media streams is amended to also hold rate share information. The purpose of rate share information is to inform a server as to how media should be extracted from each scalable media stream at any instance of time. This enables a controlled or recommended way of scaling media at the server, thus enabling the generation of elementary media streams.

Figure 4:
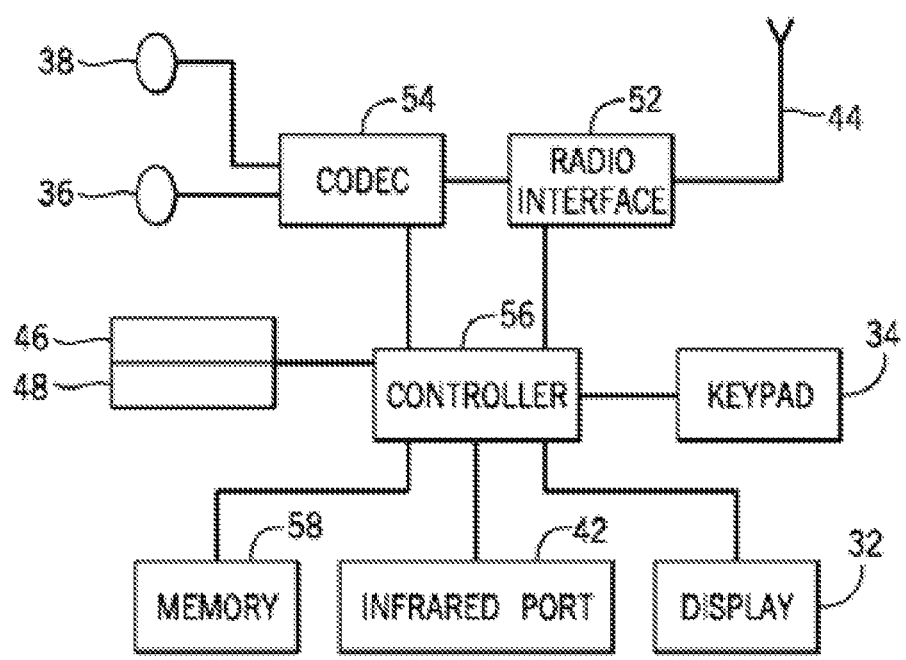
FIG. 4 is a schematic representation of the telephone circuitry of the mobile telephone of FIG. 2.

Timed rate-share information may be added to scalable media streams stored in media tracks by associating portions (i.e., time ranges) of media with rate share information records specifying a target rate share value. The target rate share value indicates a target percentage of available bitrate that should be allocated to the media in question. In the simplest scenario, only one target rate share value is specified per media and time range as illustrated in FIG. 4.

However, in order to accommodate rate share values that vary with the available bitrate, it is possible to specify more than one operation range. For example, it can be indicated that an audio stream portion requires a higher percentage of the available bitrate (than video) at low available bitrates. This is done by specifying two operation points as shown in FIG. 5.

Figure 5:
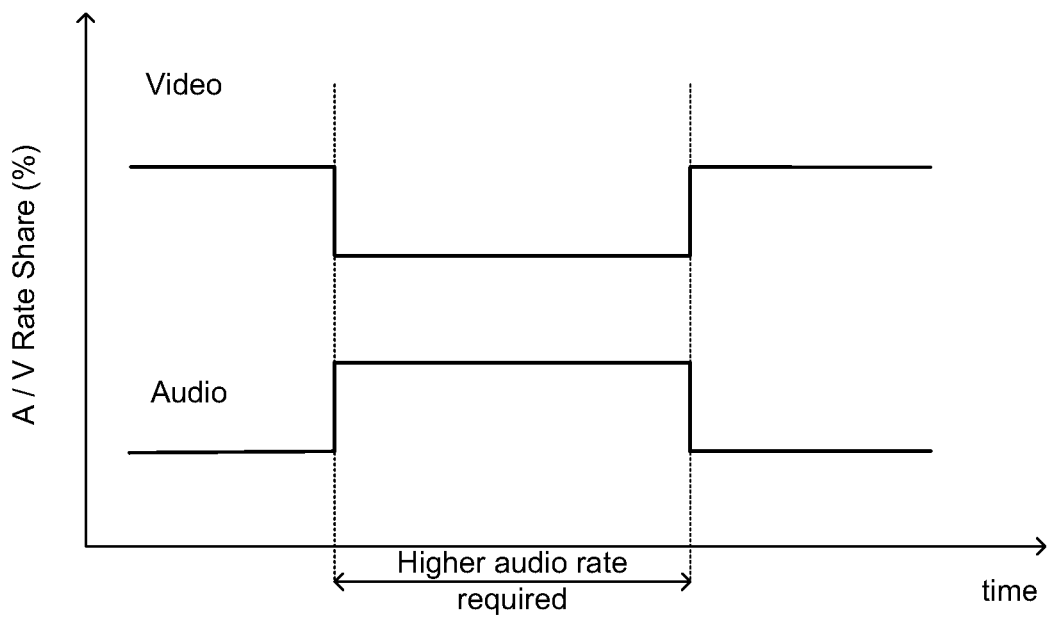
FIG. 5 shows a graph indicating audio/video rate share as a function of time.
Figure 6:
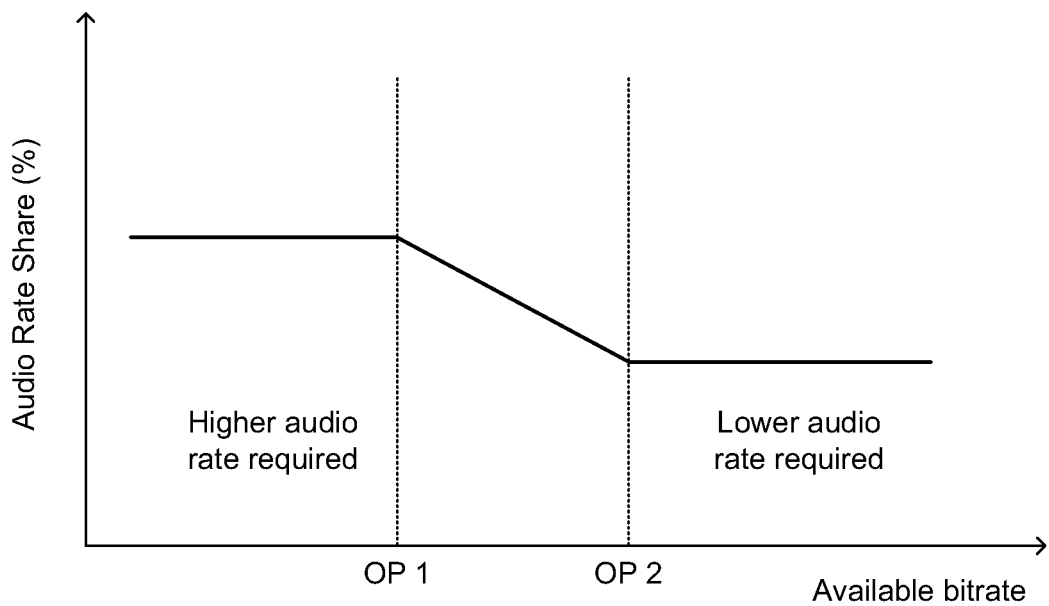
FIG. 6 shows a graph indicating audio rate share as a function of available bitrate.

Each operation point in FIG. 5 specifies a target rate share. For more complex situations it is also possible to specify more operation points. In addition, the first and the last operation points specify a target rate share at those points as well as for lower and higher available bitrates, respectively. The target rate share between two operation points is specified to be in the range between the target rate shares of those operation points. It is possible to estimate the target rate share between two operation points with linear interpolation, for example.

As noted above, the present invention provides a file format structure, referred to herein as a "rate share operation box," for indicating which adaptation operation points for coded media are available in a file. An adaptation operation point specifies how a coded multimedia clip, consisting of one or more coded media bitstreams, is scaled by selecting which parts of the one or more coded media bitstreams are processed. Processing of the one or more coded media bitstreams can include one or more of the following: composing of transmission packets, transmission, and decoding of the scaled media bitstreams.

Furthermore, the rate share operation box can include a characterization of the adaptation result for each adaptation operation point, such as whether the adaptation results into a desired total bitrate shared among all the associated tracks or whether the adaptation results into a stable quality in each associated track. Moreover, the rate share operation box can also include an identifier that indicates which algorithm was used to generate each adaptation operation point. An adaptation operation point also corresponds to an adaptation path in each track associated with the adaptation operation point. An adaptation operation point and a particular adaptation path can be characterized in the rate share operation box, e.g., in terms of the minimum and maximum bitrate achievable by the adaptation path, the axes used for adaptation, such as spatial adaptation of pictures, quality adaptation of pictures, picture rate adaptation, or any combination thereof. An embodiment of the present invention is presented below in the form of a rate share operation box following the pseudocode notation used in the ISO base media file format. A Movie box ('moov') contains zero or one rate share operation box ('rsop') as defined below.

```
aligned(8) class RateShareOperationBox
    extends FullBox('rsop', version=0, 0) {
    unsigned int(16)   operation_point_count;
    for (i=1; i <= operation_point_count; i++) {
        unsigned int(32)   operation_description;
        unsigned int(32)   track_count;
        for (j=1; j <= track_count; j++) {
            int(32)   track_id;
            unsigned int(15)   adaptation_path_id;
            unsigned int(1)    reserved;
            unsigned int(32)   rate_adaptation_algorithm;
            unsigned int(32)   num_constants_in_adaptation_path;
            for (k=1; k <= num_constants_in_adaptation_path; k++)
                unsigned int(32)   constant_list;
        }
        if ((operation_description & 1) == 1) {
            unsigned int(32)   minimum_bitrate;
            unsigned int(32)   maximum_bitrate;
        }
    }
}
```

The semantics of the syntax elements in the rate share operation box are as follows:

operation_point_count is an integer that gives the number of operation points.

operation_description indicates the output characteristics of the rate adaptation operation of this operation point. The following flags for operation_description are specified:

0x1 The cumulative output bitrate of all associated tracks is fixed to the available bitrate.

0x2 The subjective quality of each associated track remains similar throughout the duration of the track.

track_count indicates the number of tracks that are associated with this operation point. If track_count is equal to 1, then the information signalled for this operation point prescribes an adaptation rule for the single media type contained in the single identified track. If track_count is greater than 1, and all the indicated tracks contain the same media type, then the information signalled for this operation point still describes an adaptation rule for the single media type, contained in the multiple identified tracks.

track_id indicates the track_ID of the track that is associated to the operation point.

adaptation_path_id shall be zero if the track_id does not refer to a timed metadata track containing generic scalable media metadata. Otherwise, adaptation_path_id indicates which adaptation path should be used in this operation point.

rate_adaptation_algorithm equal to 0 indicates that no adaptation should be done for any associated track but rather all samples of the associated track should be processed as follows. If the associated track is a hint track, packets corresponding to all hint samples should be generated. If the associated track is an SVC media track, all samples, including the potential extractor NAL units, should be parsed. For any other tracks, all samples should be parsed normally. The output of this processing shall comply with the characteristics of the operation point as indicated in this box. rate_adaptation_algorithm equal to 1 indicates that an unknown adaptation algorithm should be used to obtain the target rate share indicated by the rate share sample grouping. Other values of rate_adaptation_algorithm are unspecified in this specification but identify the algorithm that is used to obtain the adaptation paths in the referred generic scalable media metadata tracks.

num_constants_in_operation_points specifies the number of the characteristics that remain constant in this adaptation path.

constant_list is a four-character code that implicitly point to boxes or structures that specify the constant characteristics of this adaptation path. The four-character codes include those that are specified for the Track Selection Box of SVC. The constant list enables to select an appropriate operation point according to the capabilities of the device and/or software playing the file or receiving the packet streams composed according to the hint tracks included in the file.

minimum_bitrate is a nonzero value (in kilobits per second) indicating the lowest cumulative bitrate this operation point should be applied.

maximum_bitrate is a nonzero value (in kilobits per second) indicating the highest cumulative bitrate this operation point should be applied.

As described above, the target rate-share indicates the target percentage of the available bitrate that should be allocated to the media in question. Given this allocation, the maximum and minimum bitrates are used to specify boundaries. Maximum bitrate gives an upper limit of the available bitrate for the specified media and time range. Alternatively, it can be used to provide an upper threshold for which the allocated bitrate is a priority for the media. Minimum bitrate indicates a lower threshold that is deemed useful. For example, if the allocated bitrate falls below this minimum bitrate value, the recommendation to the server is to not allocate any bitrate at all to the media. The bitrate could then either be given to the other media stream(s), or an alternative stream, if available.

The sample grouping mechanism for rate share information can be used to indicate a target bitrate share between tracks. The algorithm to thin the tracks to the target bitrate is unspecified. If the track_id in an operation point refers to a track that is not a timed metadata track containing generic scalable media metadata, the track may contain sample grouping as specified in this paragraph. Rate-share information defined by the sampling grouping mechanism applies to the duration of a media sample. However, as the same rate-share information is likely to apply to many consecutive samples of a track and will perhaps only vary between two or three different records, rate-share information can be efficiently stored in a track by using sample groups. Each sample of a track may be associated to (zero or) one of a number of sample group descriptions, each of which defines a record of rate-share information. The sample group description contains identifiers of the operation points to which the associated sample belongs to.

A device, a software program, a component, or any other appropriate unit processing a file with a rate share operation box can choose a desired adaptation operation point. The choice made is based upon how the constraints and capabilities of the device and the potential receiving unit match with the characteristics of the adaptation operation point or the desired algorithm with which the adaptation operation point was calculated.

An example system for choosing an adaptation operation point is described as follows. A streaming server has access to a file containing a rate share operation box. The file contains a non-scalable audio bitstream and a scalable video bitstream, which is scalable in terms of quality as well as temporally. Two adaptation operation points are indicated in the rate share operation box, both targeted for sharing a total bitrate between audio and video. Each adaptation operation point refers to a pair of hint tracks, a hint track for audio and another hint track for video. The rate share operation box indicates that in the first adaptation operation point, the video is scaled temporally, while quality-wise scaling is used in the second adaptation operation point. A one-to-one (i.e., unicast) streaming session is established between a recipient and the server. Both temporal and quality-wise options are announced from the server to the recipient. The recipient unit can include a user interface switch to choose the user's preference whether frame rate (temporal scaling) or picture fidelity (quality scaling) is preferred. Based on the user's choice, the recipient unit indicates to the server which adaptation path should be followed. The server then creates packets based on the appropriate hint track and adaptation path indicated by the recipient.

Adaptation paths are signaled with a file format structure, referred to as generic scalable media metadata track. A generic scalable media metadata track is associated to one coded media bitstream (media track) or a hint track containing structures to form transport packet from a coded media bitstream. In other words, a generic scalable media metadata track contains "cookbook" instructions that can be utilized to thin a referred track to a desired bitrate or quality. Decoding a generic scalable media metadata track results into adapted samples. If the track referred from a generic scalable media metadata track is a hint track, the adapted samples are valid packet payloads. If the referred track is a media track, the adapted samples are valid media samples, such as coded pictures or access units of video or coded audio frames.

An embodiment of the generic scalable media metadata track is provided in the following. A generic scalable media metadata track is a timed metadata track, which is identified with a 'meta' handler_type in the media box. The timed metadata track is further characterized to be a generic scalable media metadata track by including a generic scalable media metadata header box in the media information box. The generic scalable media metadata header box contains general information related to the track as specified below:

```
aligned(8) class GenericScalableMediaMetadataHeaderBox
    extends FullBox('gshd', version = 0, 1) {
    unsigned int(15) num_adaptation_paths;
    unsigned int(1) reserved;
    for (i=1; i<=num_adaptation_paths; i++) {
        unsigned int(15)  adaptation_path_id;
        unsigned int(1)   truncation_flag;
    }
}
``` num_adaptation_paths indicates how many adaptation paths the track provides.
adaptation_path_id refers to the adaptation path characterized in the Rate share operation box and identifies the adaptation path.
truncation_flag equal to 1 indicates that some parts labeled with this adaptation path identifier in some samples can be truncated. truncation_flag equal to 0 indicates that no part labeled with this adaptation path identifier in any sample can be truncated.

The sample entry of a generic scalable media metadata track is specified as follows:

```
class GenericScalableMediaMetadataSampleEntry( ) extends
MetadataSampleEntry('gsmm') {
    unsigned int(2) log2_num_parts_minus_one;
    unsigned int(2) log2_num_paths_minus_one;
    unsigned int(2) log2_offset_minus_one;
    unsigned int(2) log2_size_minus_one;
}
```

The fields of the sample entry are used to specify the size (8, 16, 24, or 32 bits corresponding to values 0, 1, 2, and 3 of the fields, respectively) of the syntax elements used the sample structure for the track.

A sample in the generic scalable media metadata track uses the following structure:

```
aligned(8) generic_scalable_media_metadata_sample(sampleSize) {
    unsigned int((log2_num_parts_minus_one+1)*8) num_parts;
    for (i=1; i<= num_parts; i++) {
        unsigned int((log2_num_paths_minus_one+1)*8-1)
num_paths_whole_part;
        unsigned int(1) truncatable_part_flag;
        for(j=1; j <= num_paths_whole_part; j++) {
            unsigned int(15) path_id_whole_part;
            unsigned int(1) reserved;
        }
        if (num_paths_whole_part > 0) {
            unsigned int((log2_offset_minus_one+1)*8)
            offset_whole_part;
            unsigned int((log2_size_minus_one+1)*8)
num_bytes_whole_part;
        }
        if (truncatable_part_flag == 1) {
            unsigned int((log2_num_paths_minus_one+1)*8-1)
num_partitionigs;
            unsigned int(1) reserved;
            for (k=1; k <= num_partitionings; k++) {
                unsigned int((log2_num_paths_minus_one+1)*8-1)
                num_paths;
                unsigned int(1) reserved;
                for (m=1; m <= num_paths; m++) {
                    unsigned int(15) path_id;
                    unsigned int(1) reserved;
                }
                unsigned int(8) num_subparts;
                for (m=1; m <= num_subparts; m++){
                    unsigned int((log2_offset_minus_one+1)*8)
                    offset;
                    unsigned int((log2_size_minus_one+1)*8)
                    num_bytes;
                    unsigned int(7) reserved;
                    unsigned int(1) free_truncation_flag;
                }
            }
        }
    }
}
```

The Generic scalable media sample entry contains the values of log2_num_parts_minus_one, log2_num_paths_minus_one, log2_path_id_minus_one, log2_offset_minus_one, and log2_size_minus_one.

The metadata samples are temporally aligned to the samples in referred media or hint track (in decoding time). Each metadata sample (also called an adaptation sample) is associated to the corresponding adapted sample, which is derived from the initial adapted sample as follows.

An initial adapted sample can be derived from the coded media sample or the hint sample associated to an adaptation sample. When the associated track is a media track, an initial adapted sample is derived from an associated media sample. If the media sample does not contain aggregator or extractor NAL units as specified in the SVC file format, the initial adapted media sample is identical to the media sample. Otherwise, data referenced by the extractor NAL units is inserted to the initial adapted sample instead of the extractor NAL unit, the headers for aggregator NAL units are removed, and any remaining portions of the initial adapted media sample contains the data of the media sample as is. When the associated track is a hint track, the initial adapted sample is derived from the associated hint sample. The initial adapted sample is identical to the packet payload that is generated using the payload constructors of the sample.

An adaptation sample contains information, for each adaptation path, where parts of the initial adapted sample are included in the adapted sample. The indication of parts can be indicated with a list of byte ranges within the initial adapted sample. The use of byte ranges makes the solution ignorant of the syntax of the media sample or packet payload and hence applicable to any coding or packet payload format. An adaptation sample may also contain an indication per each indicated byte range if the byte range can be freely truncated to any length starting from the beginning of the indicated range.

The presented sample structure of generic scalable media metadata maps indicated byte ranges of the initial adapted sample to an adapted sample. Different byte ranges can be indicated for different adaptation paths. It can also be indicated whether a certain byte range is freely truncatable, i.e. that any number of bytes from the byte range starting from its beginning can be included in the adapted sample.

The semantics of the sample structure for generic scalable media metadata track are as follows:

num_parts indicates the number of parts in the initial adapted sample. No exact definition of a part is given, but it is typically a byte range within the initial adapted sample that corresponds to a unit of prediction reference, such as a coded picture in scalable video.

num_paths_whole_part indicates the number of adaptation paths in which the entire part is included.

truncatable_part_flag equal to 0 indicates that the part cannot be truncated.

truncatable_part_flag equal to 1 indicates that at least one subpart of the part can be truncated.

path_id_whole_part indicates the adaptation path identifier for the part as introduced in the Rate share operation box.

offset_whole_part indicates the byte offset to the initial adapted sample from which the part starts. The first byte offset of the initial adapted sample has value 0.

num_bytes_whole_part indicates the number of bytes included in the part.

num_partitionings indicates the number of partitionings that a part is divided into subparts. Each unique way to split a part into subparts is a partitioning. For example, if a part corresponds to a fine granular scalable picture, and there are two adaptation paths specified, allowing bitrate scaling in the range of 50 to 100% and 80 to 100% of the total size of the picture, respectively, then there would be two partitionings for the part. In the first partitioning, a subpart corresponding to a byte range of 50% of the size of the picture would be indicated with free_truncation_flag equal to 0, and the remaining subpart of the picture would be marked with free_truncation_flag equal to 1. Subparts for the second partitioning would be indicated similarly.

num_paths indicates the number of adaptation paths that share the same partitioning of a part to subparts.

path_id indicates the adaptation path identifier for the subparts specified for the partitioning as introduced in the Rate share operation box.

num_subparts indicates the number of subparts. No exact definition of a subpart is given, but it is a byte range within a part that corresponds e.g. to slice header and slice data of a fine granular scalable coded slice.

offset indicates the byte offset to the initial adapted sample from which the subpart starts. The first byte offset of the initial adapted sample has value 0.

num_bytes indicates the number of bytes included in the subpart.

free_truncation_flag equal to 0 indicates that the subpart shall not be truncated.

free_truncation_flag equal to 1 indicates that the subpart may be truncated to any length by excluding samples starting from the end of the subpart.

An adapted sample is created as follows. Let currPathId be equal to the identifier for the desired adaptation path. For a sample that contains data for the desired adaptation path, as indicated by rate-sharing information sample group, the following process is performed. For each indicated part, the list of path_id_whole_part is first compared to currPartId. If there is a value of path_id_whole_part equal to currPartId, then the whole_part indicated by the values of offset_whole_part and num_bytes whole_part is included in the adapted sample. If there is no value of path_id whole_part equal to currPartId and truncatable_part_flag is equal to 1, a loop of indicated partitionings to subparts is executed until a value of path_id equal to currPathId is found. Then, each subpart, indicated by the values of offset and num_bytes, is included in the adapted sample. If further truncation of the adapted sample is required to meet a certain bit budget, for example, those subparts for which free_truncation_flag is equal to 1 are truncated to a desired length.

The adapted samples form an adapted track. If the referred track is a hint track, the adapted samples are valid packet payloads. If the referred track is a media track, the adapted samples are valid media samples.

It should be noted that coded samples in video coding are typically coded pictures or access units. Coded samples in audio are typically coded audio frames. In addition, as described above, no guarantee as to stream validity is given if the simple_priority_id threshold is changed in the middle of a coded video sequence (i.e. between IDR access units). The same holds true for adaptation paths proposed in this invention. In order to indicate valid switching points between adaptation paths, the sample grouping mechanism for adaptation path switch points is used to indicate the adapted samples which can be used to switch from one adaptation path to another. The need for this sample grouping mechanism arises from the fact that SVC utilizes single-loop decoding, i.e. reference pictures decoded only for the highest decoded layer. Consequently, switching between layers is not possible at arbitrary locations, as at some locations the reference pictures of the layer to be switched have not been decoded. This sample grouping mechanism can therefore be used to indicate layer switching points or, more generally, switch points between adaptation paths.

[If the adaptation path switch sample group description is present, each sample of a track is mapped to one adaptation path switch point entry specified below. Zero or one sample-to-group box ('sbgp') for the grouping type 'tpsw' can be contained in the sample table box ('stbl') of a Generic scalable media metadata track. The adaptation path switch point sample group entry is defined below:

```
class AdaptationPathSwithPointEntry( ) extends
SampleGroupDescriptionEntry('tpsw')
{
    unsigned int(8) num_refresh;
    for (i=1; i<=num_refresh; i++) {
        unsigned int(15) refresh_adaptation_path_id;
        unsigned int(1) reserved;
    }
}
```

The semantics of the adaptation path switch point sample group entry are as follows: num_refresh indicates the number of adaptation paths that can be switched to at this sample when any adaptation path was previously used in the generation of adapted samples.

refresh_adaptation_path_id indicates the identifiers for those adaptation paths that can be switched to when any adaptation_path was previously used in the generation of adapted samples.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
generating a file including a scalable media bitstream and associated data; and
generating information related to adaptation operation points included in the associated data, wherein the information related to the adaptation operation points comprises an indication of an algorithm used to generate each of the adaptation operation points, a characterization of the adaptation result for each adaptation operation point, and an element indicating an adaptation path associated with each of the adaptation operation points, wherein the adaptation path associated with an adaptation operation point specifies a dependency level, temporal level, or quality level of the scalable media represented by the adaptation operation point; and
wherein the adaptation result identifies whether the adaptation results into a desired total bitrate shared among all associated tracks or whether the adaptation results into a stable quality in each associated track.

2. A method according to claim 1, wherein the information related to the adaptation operation points further comprises an element indicating the number of the adaptation operation points present in the file.

3. A computer program product comprising a non-transitory computer-readable storage medium and computer instructions stored therein, the computer program instructions comprising program instructions configured to:
generate a file including a scalable media bitstream and associated data; and
generate information related to adaptation operation points included in the associated data, wherein the information related to the adaptation operation points comprises an indication of an algorithm used to generate each of the adaptation operation points, a characterization of the adaptation results for each adaptation operation point, and an element indicating an adaptation path associated with each of the adaptation operation points, wherein the adaptation path associated with an adaptation operation point specifies a dependency level, temporal level, or quality level of the scalable media represented by the adaptation operation point; and
wherein the adaptation result identifies whether the adaptation results into a desired total bitrate shared among all associated tracks or whether the adaptation results into a stable quality in each associated track.

4. A computer program product according to claim 3, wherein the information related to the adaptation operation points further comprises an element indicating the number of the adaptation operation points present in the file.

5. An apparatus generator configured to generate a file including a scalable media bitstream and associated data, comprising:
a processor; and
a memory unit operatively connected to the processor and computer code for generating information related to adaptation operation points included in the associated data, wherein the information related to the adaptation operation points comprises an indication of an algorithm used to generate each of the adaptation operation points, a characterization of the adaptation result for each adaptation operation point, and an element indicating an adaptation path associated with each of the adaptation operation points, wherein the adaptation path associated with an adaptation operation point specifies a dependency level, temporal level, or quality level of the scalable media represented by the adaptation operation point; and
wherein the adaptation result identifies whether the adaptation results into a desired total bitrate shared among all associated tracks or whether the adaptation results into a stable quality in each associated track.

6. An apparatus according to claim 5, wherein the information related to the adaptation operation points further comprises an element indicating the number of the adaptation operation points present in the file.

7. A method comprising:
parsing a file including a scalable media bitstream and associated data;
parsing from the associated data, information related to adaptation operation points, wherein the information related to the adaptation operation points comprises an indication of an algorithm used to generate each of the adaptation operation points, and an element indicating an adaptation path associated with each of the adaptation operation points, wherein the adaptation path associated with an adaptation operation point specifies a dependency level, temporal level, or quality level of the scalable media represented by the adaptation operation point;
choosing an adaptation operation point based on the information on adaptation operation points, and a characterization of the adaptation result for each adaptation operation point, wherein the adaptation result identifies whether the adaptation results into a desired total bitrate shared among all associated tracks or whether the adaptation results into a stable quality in each associated track; and
parsing the file according to the adaptation operation point.

8. A method according to claim 7, wherein the information related to the adaptation operation points further comprises an element indicating the number of the adaptation operation points present in the file.

9. A computer program product comprising a non-transitory computer-readable storage medium and computer program instructions stored therein, the computer program instructions comprising program instructions configured to:
parse a file including a scalable media bitstream and associated data;
parse, from the associated data, information related to adaptation operation points, wherein the information related to the adaptation operation points comprises an indication of an algorithm used to generate each of the adaptation operation points, and an element indicating an adaptation path associated with each of the adaptation operation points, wherein the adaptation path associated with an adaptation operation point specifies a dependency level, temporal level, or quality level of the scalable media represented by the adaptation operation point;
choose an adaptation operation point based on the information on adaptation operation points, and a characterization of the adaptation result for each adaptation operation point, wherein the adaptation result identifies whether the adaptation results into a desired total bitrate shared among all associated tracks or whether the adaptation results into a stable quality in each associated track; and
parse the file according to the adaptation operation point.

10. A computer program product according to claim 9, wherein the information related to the adaptation operation points further comprises an element indicating the number of the adaptation operation points present in the file.

* * * * *

UNITED STATES PATENT AND TRADEMARK OFFICE
CERTIFICATE OF CORRECTION

| | | |
|---|---|---|
| PATENT NO. | : 9,807,431 B2 | Page 1 of 1 |
| APPLICATION NO. | : 11/874138 | |
| DATED | : October 31, 2017 | |
| INVENTOR(S) | : Hannuksela et al. | |

It is certified that error appears in the above-identified patent and that said Letters Patent is hereby corrected as shown below:

In the Claims

Column 16,
Line 26, "results" should read --result--.

Signed and Sealed this
Nineteenth Day of June, 2018

Andrei Iancu
*Director of the United States Patent and Trademark Office*